Patented Sept. 22, 1931

1,824,020

UNITED STATES PATENT OFFICE

ALAN C. JOHNSTON, OF KENVIL, NEW JERSEY, ASSIGNOR TO HERCULES POWDER COMPANY, OF WILMINGTON, DELAWARE, A CORPORATION OF DELAWARE

METHOD OF PRODUCING RESIN ESTERS

No Drawing.   Application filed April 12, 1928.   Serial No. 269,611.

My invention relates to an improved method of producing resin esters, such for example, as the esters of abietic acid, pimaric acid, etc. and my invention relates to the production of resin esters by the treatment of a resin acid, the ester of which is desired, or by the treatment of a resin in which such acid is found.

Resin esters to the production of which my invention relates vary substantially in their characteristics, some being, for example, viscous liquids, while others are hard, tough solids, and they find their principal use in varnishes and lacquers in which they may be used instead of ordinary ester gum.

The method in accordance with my invention involves generally speaking the treating of a resin acid, as for example, abietic acid, pimaric acid, etc., or a resin, as for example, wood or gum rosin, copal, etc., with a chlorohydrin, or a bromohydrin, in the presence of an alkali.

More specifically, in carrying out the method in accordance with my invention, the treatment is preferably by heating the resin or resin acid and the alkali which, for example, may be sodium hydroxide, sodium carbonate, potassium hydroxide and the like, in solution, for example, in alcohol, or water. The treatment may be effected by heating under pressure or by refluxing.

Various chlorohydrins may be used, as for example, ethylene chlorohydrin, propylene chlorohydrin, glycerolmonochlorohydrin and the like, or mixtures thereof and various bromohydrins, as for example, ethylene bromohydrin, trimethylene bromohydrin, glycerolmonobromohydrin, and the like, or mixtures thereof may be used.

As an illustration of the application of the method embodying my invention to the production of, for example, the ester ethylene glycol monoabietate, say 10 parts of sodium hydroxide are dissolved in 100 parts of ethyl alcohol, 75 parts of gum WW rosin, or wood rosin, being subsequently dissolved in the alcohol solution. The solution is refluxed at a temperature of say about 80° C. and 25 parts of ethylene chlorohydrin, boiling point about 132° C., are added gradually to the refluxing solution. Sodium chloride or common salt will be formed and separates rapidly. The refluxing may be continued at a temperature of about 80° C. for upwards of twelve hours. When the refluxing has been continued sufficiently for the formation of the desired ester, the salt is filtered off and the alcohol and excess chlorohydrin removed by distillation. The ester remaining will distill at a temperature of about 250° C., under reduced pressure of say about 5 mm. A yield of about 45 parts of the ester in the form of a very viscous liquid and having an acid number of 5 will be obtained. The reactions according to the above example may be expressed as follows:

(1) $C_{19}H_{29} \cdot COOH + NaOH \rightarrow C_{19}H_{29}COONa + H_2O$
(2) 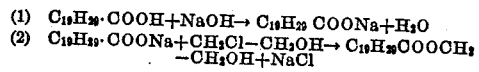

Propylene glycol monoabietate may be prepared in a manner similar to that given above for the preparation of ethylene glycol monoabietate yielding, if the same proportions be used, about 35 parts of ester distilling at about 260° C. under 5 mm. pressure and having an acid number of 5.

As a further example, the ester glycerol monoabietate may be prepared by refluxing, at a temperature of about 80° C. 70 parts of glycerolmonochlorohydrin with a solution of 150 parts of wood or gum rosin in 200 parts of alcohol containing 20 parts of sodium hydroxide. The refluxing may be continued at a temperature of about 80° C. for about eight hours after which the sodium chloride formed is filtered off and the alcohol and excess chlorohydrin removed by distillation. The ester obtained, in the amount of about 145 parts, will not distill under 5 mm. pressure at a bath temperature of 300° C. and will be found to be hard and tough, having a melting point of about 83° C. by the drop method, an acid number of 2 and containing only about 0.03% ash.

In the carrying out of the method as illustrated by the above examples, the reaction period may be decreased by heating at a temperature, for example, up to about 150° C. under a pressure within, for example, the range atmospheric to about 150 pounds per square inch.

As has been indicated various chlorohydrins and bromohydrins may be used in producing esters in accordance with the method involving my invention, from various resin acids and resins, likewise various alkalis may be used and the method may be carried out with aqueous solutions as well as with solutions formed by the use of alcohol, and it will be understood that where in the claims appended hereto reference is made to a chlorohydrin, I intend to include and cover the use of bromohydrins as equivalents.

Having now fully described my invention, what I claim and desire to protect by Letters Patent is:

1. The method of producing a resin acid ester which includes heating a resin acid with a chlorohydrin and an alkali in the presence of a solvent for the chlorohydrin and alkali.

2. The method of producing a resin acid ester which includes heating a resin with a chlorohydrin and an alkali in the presence of a solvent for the chlorohydrin and alkali.

3. The method of producing a resin acid ester which includes heating abietic acid with a chlorohydrin and an alkali in the presence of a solvent for the chlorohydrin and alkali.

4. The method of producing a resin acid ester which includes heating a resin acid, a chlorohydrin and an alkali in the presence of a solvent for the said substances.

5. The method of producing a resin acid ester which includes heating a resin, a chlorohydrin and an alkali in the presence of a solvent for the said substances.

6. The method of producing a resin acid ester which includes heating abietic acid, a chlorohydrin and an alkali in the presence of a solvent for the said substances.

7. The method of producing a resin acid ester which includes heating a resin acid, a mono-chlorohydrin and an alkali in the presence of a solvent for the said substances.

8. The method of producing a resin acid ester which includes heating a resin, a mono-chlorohydrin and an alkali in the presence of a solvent for the said substances.

9. The method of producing a resin acid ester which includes heating abietic acid, a mono-chlorohydrin and an alkali in the presnce of a solvent for the said substances.

10. The method of producing a resin acid ester which includes heating a resin acid, ethylene chlorohydrin and an alkali in the presence of a solvent for the resin acid and chlorohydrin.

11. The method of producing a resin acid ester which includes heating abietic acid, ethylene chlorohydrin and an alkali in the presence of a solvent for the abietic acid and chlorohydrin.

12. The method of producing a resin acid ester which includes heating a resin acid, and ethylene chlorohydrin with an alkali in the presence of a solvent for the said substances.

13. The method of producing a resin acid ester which includes heating abietic acid and ethylene chlorohydrin with an alkali in the presence of a solvent for the said substances.

14. The method of producing a resin acid ester which includes heating rosin and ethylene chlorohydrin with an alkali in the presence of a solvent for the said substances.

15. The method of producing a resin acid ester which includes heating a resin acid with a chlorohydrin and an alkali in the presence of alcohol.

16. The method of producing a resin acid ester which includes heating abietic acid with a chlorohydrin and an alkali in the presence of alcohol.

17. The method of producing a resin acid ester which includes heating rosin with a chlorohydrin and an alkali in the presence of alcohol.

18. The method of producing a resin acid ester which includes heating a resin acid, a mono-chlorohydrin and an alkali in the presence of alcohol.

19. The method of producing a resin acid ester which includes heating abietic acid, a mono-chlorohydrin and an alkali in the presence of alcohol.

20. The method of producing a resin acid ester which includes heating rosin, a mono-chlorohydrin and an alkali in the presence of alcohol.

21. The method of producing a resin acid ester which includes heating a resin acid, ethylene chlorohydrin and an alkali in the presence of alcohol.

22. The method of producing a resin acid ester which includes heating abietic acid, ethylene chlorohydrin and an alkali in the presence of alcohol.

23. The method of producing a resin acid ester which includes heating rosin, ethylene chlorohydrin and an alkali in the presence of alcohol.

24. The method of producing a resin acid ester, which includes heating an alkali metal resinate and a chlorohydrin in the presence of a solvent for the said substances.

25. The method of producing a resin acid ester, which includes heating an alkali metal abietate and a chlorohydrin in the presence of a solvent for the said substances.

26. The method of producing a resin acid ester, which includes heating an alkali metal resinate and a chlorohydrin in the presence of alcohol.

27. The method of producing a resin acid ester, which includes heating an alkali metal abietate and a chlorohydrin in the presence of alcohol.

28. The method of producing a resin acid ester, which includes heating an alkali metal resinate and ethylene chlorohydrin in the presence of alcohol.

29. The method of producing a resin acid ester, which includes heating an alkali metal abietate and ethylene chlorohydrin in the presence of alcohol.

In testimony of which invention, I have hereunto set my hand, at Kenvil, N. J., on this 22nd day of April, 1928.

ALAN C. JOHNSTON.